(12) United States Patent
Kamon et al.

(10) Patent No.: US 10,021,469 B2
(45) Date of Patent: Jul. 10, 2018

(54) SOUND EMITTER DEVICE

(71) Applicant: Delphi Technologies, Inc., Troy, MI (US)

(72) Inventors: Michal Kamon, Zileonki (PL); Grzegorz Tkaczyk, Cracow (PL)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/375,261

(22) Filed: Dec. 12, 2016

(65) Prior Publication Data
US 2017/0180837 A1   Jun. 22, 2017

(30) Foreign Application Priority Data
Dec. 17, 2015   (FR) ...................... 15 62634

(51) Int. Cl.
*H04R 9/00* (2006.01)
*H04R 1/02* (2006.01)
*B60Q 5/00* (2006.01)
*H04R 7/18* (2006.01)
*H04R 31/00* (2006.01)
*H04R 7/22* (2006.01)

(52) U.S. Cl.
CPC ............ *H04R 1/026* (2013.01); *B60Q 5/008* (2013.01); *H04R 7/18* (2013.01); *H04R 7/22* (2013.01); *H04R 31/003* (2013.01); *H04R 31/006* (2013.01); *B60Y 2200/91* (2013.01); *B60Y 2200/92* (2013.01); *H04R 2231/003* (2013.01); *H04R 2307/207* (2013.01); *H04R 2499/13* (2013.01)

(58) Field of Classification Search
CPC .......... H04R 1/02; H04R 1/025; H04R 1/026; H04R 9/00
USPC ................................. 381/386, 388–389, 396
See application file for complete search history.

(56) References Cited

U.S. PATENT DOCUMENTS 3,614,335 A * 10/1971 Dymoke-Bradshaw . H04R 7/18
381/354

* cited by examiner

*Primary Examiner* — Suhan Ni
(74) *Attorney, Agent, or Firm* — Lawrence D. Hazelton

(57) ABSTRACT

A sound emitter device for use on a motor vehicle comprises a casing comprising an axial wall and a bottom wall, the axial wall extending along a vertical axis from the bottom wall toward an opening opposite the bottom wall, a control circuit, an acoustic membrane that closes the opening of the casing and that is provided on its lower face with excitation means controlled by the control circuit a peripheral rim that is arranged in the opening, the external peripheral edge of the acoustic membrane being mounted to bear on the peripheral rim, a secondary wall that is made in one piece with the peripheral rim and that is bent toward the peripheral rim so as to retain the acoustic membrane by clamping its external peripheral edge between the peripheral rim and the secondary wall.

7 Claims, 6 Drawing Sheets

SOUND EMITTER DEVICE

CROSS-REFERENCE TO RELATED APPLICATION

This application claims the benefit under 35 U.S.C. § 119(a) of French Patent Application FR1562634, filed Dec. 17, 2015, the entire disclosure of which is hereby incorporated herein by reference.

TECHNICAL FIELD OF INVENTION

This disclosure generally relates to a sound emitter device for use on a motor vehicle, and more particularly relates to the retention of an acoustic membrane of a sound emitter device.

BACKGROUND OF INVENTION

Sound emitter devices for use on vehicles and comprising an acoustic membrane are known. Alarm system sirens and sound generating devices for hybrid or electric vehicles are generally equipped with a casing containing a printed circuit board and an acoustic membrane associated with means for exciting the membrane. The free volume of the casing generally forms an acoustic chamber that enables good transmission of vibrations from the membrane to the air outside the sound emitter device to produce the required sound level. The steps of assembling such devices notably comprise the assembly of the sound producing means comprising the acoustic membrane and the means for exciting the membrane. A number of methods that make it possible to seal the junction between the casing and the membrane are known. A sealed assembly of the device is made possible by methods such as gluing the membrane to a peripheral rim of the casing or retaining it by clamping the membrane between an additional part such as a ring and the rim of the casing, the ring and the casing being vibration welded. These methods are not satisfactory from the industrial point of view, however. The production cycle times and costs of such devices no longer satisfy current market constraints.

SUMMARY OF THE INVENTION

The present invention aims to solve these problems by proposing a simple and economical solution.

According to the invention, a sound emitter device for use on a motor vehicle comprises a casing comprising an axial wall and a bottom wall, the axial wall extending along a vertical axis from the bottom wall toward an opening opposite the bottom wall, a control circuit board, an acoustic membrane arranged in the opening of the casing and that is provided on its lower face with excitation means controlled by the electronic circuit board, a peripheral rim that is arranged in the opening, the external peripheral edge of the acoustic membrane being mounted to bear on the peripheral rim, a secondary wall that is made in one piece with the peripheral rim and is bent toward the peripheral rim so as to retain the acoustic membrane by clamping its external peripheral edge between the peripheral rim and the secondary wall.

An electrical connector may preferably be electrically connected to the electronic circuit board. The peripheral rim and/or the secondary wall may include at least one protuberance bearing against the external peripheral edge of the acoustic membrane. The peripheral rim and/or the secondary wall may include at least one recess of complementary shape to the protuberance so that a part of the external peripheral edge of the acoustic membrane is pressed into the recess by the protuberance. The recess and the protuberance may be of annular shape and extend all around the perimeter of the secondary wall and the peripheral rim.

The secondary wall and the peripheral rim may include a plurality of recesses and a plurality of protuberances having concentric annular shapes. The protuberance may have in axial section a profile of semicircular or triangular or rectangular shape.

The surface of the internal peripheral rim may have in axial section a profile forming a single step. A part of the external peripheral edge of the acoustic membrane may be pressed onto the surface of the lower element of the step by the secondary wall, the other part of the external peripheral edge of the acoustic membrane may be pressed onto the surface of the higher element of the step by the secondary wall. The surface of the internal peripheral rim and the internal face of the secondary wall may be connected by a hinge area so as to form a jaw on the acoustic membrane. The lower element of the step may be adjacent the secondary wall via the hinge area.

The secondary wall and the peripheral rim may be made in one piece with an attached cover that is mounted on the casing to close the opening therein. The secondary wall and the peripheral rim may be arranged on the lower face of the cover.

According to the invention, a method of assembling a sound emitter device for use on a motor vehicle comprises the steps of: disposing the external peripheral edge of an acoustic membrane on a peripheral rim of the casing of the sound emitter device; bending a substantially cylindrical secondary wall made in one piece with the peripheral rim over the external peripheral edge of the acoustic membrane so as to hold it clamped against the peripheral rim of the casing. The bending step may be executed by hot bending of the secondary wall by means of vibration by a sonotrode.

Further features and advantages will appear more clearly on a reading of the following detailed description of the preferred embodiment, which is given by way of non-limiting example only and with reference to the accompanying drawings.

BRIEF DESCRIPTION OF DRAWINGS

Other features, aims and advantages of the invention will become apparent on reading the following detailed description with reference to the appended drawings, which are provided by way of non-limiting example and in which.

DETAILED DESCRIPTION

Figure 1:
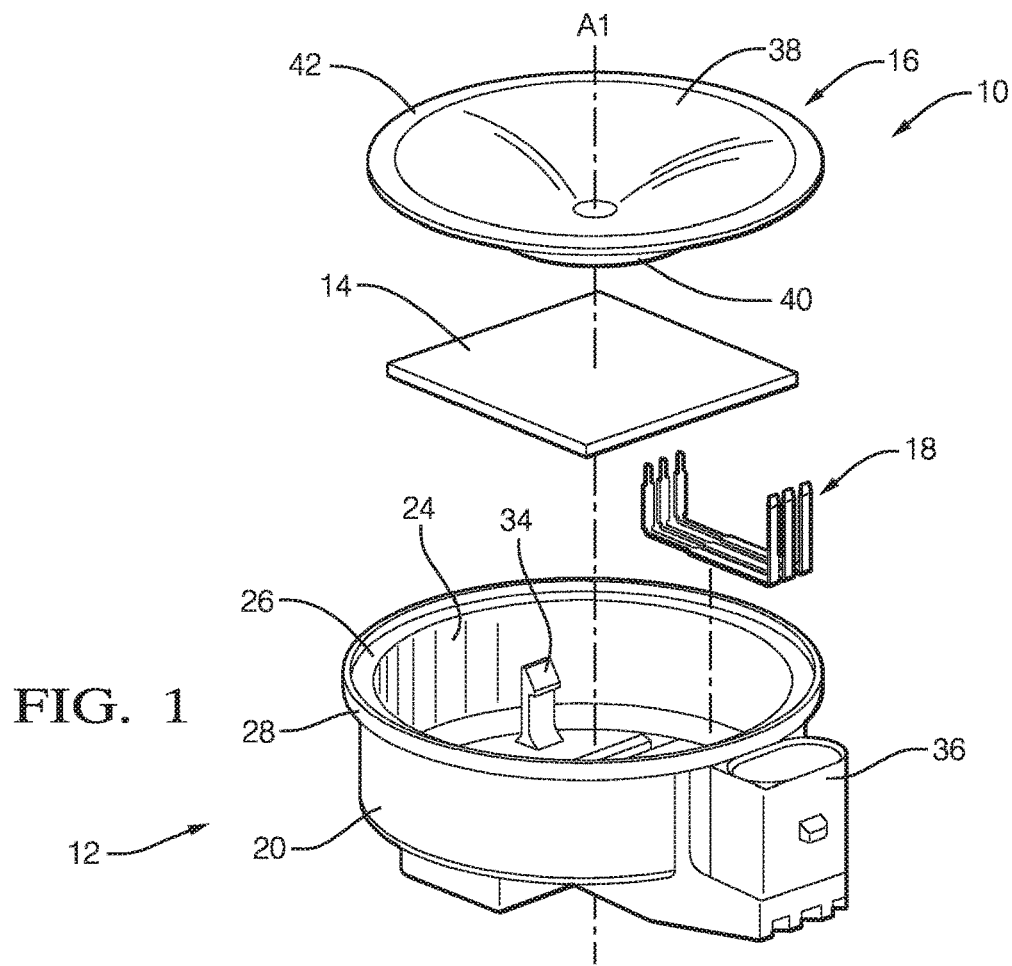
FIG. 1 is an exploded perspective view that represents the sound emitter device according to a first embodiment of the invention.

In FIG. 1 a sound emitter device 10 for use on a motor vehicle (not shown) is represented before it is assembled. The sound emitter device 10 includes a casing 12 receiving the various components of the device, in particular a control circuit 14, a sound-producing assembly 16 and electrical connection means 18.

The remainder of the description will refer in a non-limiting manner to a vertical downward orientation of the casing 12 along an axis A1, as in FIG. 1. Of course, the casing 12 can be installed in the vehicle in various positions and not exclusively as shown in FIG. 1.

The casing 12 is formed of a substantially cylindrical axial wall 20 that here extends along the vertical axis A1 from a transverse bottom wall 22 toward an upper opening 24. The upper opening 24 is preferably substantially circular. The axial wall 20 of the casing 12 includes an external peripheral rim 26 arranged in the upper opening 24. As shown, the peripheral rim 26 occupies the entire periphery of the axial wall 20. A substantially cylindrical axial secondary wall 28 is arranged around the entire external periphery of the peripheral rim 26. The secondary wall 28 is in one piece with the external peripheral rim 26.

The bottom wall 22 includes a retaining clip 34 made in one piece with the bottom wall 22, which makes it possible to retain the control circuit 14 axially in the casing 12. An electrical connector 36 may be arranged on the exterior of the casing 12 in order to connect the sound emitter device 10 to the electrical power supply network of the vehicle. Note that the casing is preferably made of a plastic material from the polybutylene terephthalate (PBT) family or the polyamide 6 (PA6) family and may contain glass fibres.

Here the sound-producing assembly 16 includes a membrane 38, or diaphragm, associated with electrical excitation means 40, such as piezoelectric, electromagnetic, electromechanical or like components making it possible to produce sound vibrations. The overall shape of the membrane 38 is that of a flexible disk curved downwards and towards its centre. The membrane 38 includes an external peripheral edge 42 enabling it to bear on the external peripheral rim 26. The external peripheral edge 42 of the membrane is a part of the disk extending from the exterior edge of the disk toward the interior thereof. The external peripheral edge 42 of the membrane is preferably a plane exterior portion of the flexible disk. The electrical excitation means 40 are preferably fixed to the lower face 39 of the membrane 38.

The control circuit 14 is preferably a printed circuit board with surface-mount electronic components and means for electrical connection to the electrical excitation means 40 and to the electrical connector 36.

The electrical connecting means 18 are provided in order to be able to connect the control circuit 14 to the electrical connector 36. The electrical connecting means 18 include conductive tongues 44. Here each conductive tongue 44 is made of cut and bent metal.

Figure 2:
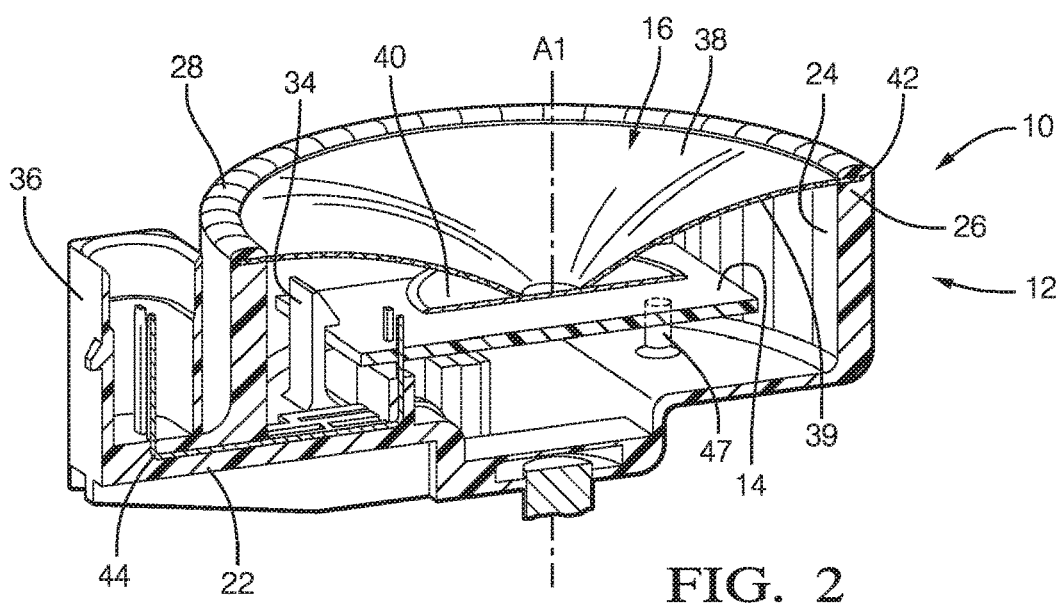
FIG. 2 is a perspective view in section along a transverse axis that represents the sound emitter device from FIG. 1 when assembled.

In FIG. 2 the sound emitter device 10 for use on a motor vehicle is represented when assembled. The conductive tongues 44 of the electrical connecting means 18 are moulded into the bottom wall 22 of the casing 12 in such a manner as to connect the connector 36 electrically to the control circuit 14. The control circuit 14 is mounted axially in the casing 12 above the electrical connecting means 18, coming to bear axially against associated bearing surfaces 47 moulded into the bottom wall 22 of the casing 12. The retaining clip 34 retains the control circuit 14 axially in the casing 12.

The control circuit 14 is connected to the connector 36 in such a manner as to exchange electrical signals with an electronic system (not represented) for monitoring the status of the vehicle. The control circuit 14 more particularly receives control signals for triggering the sound emitter device 10. In response, the control circuit 14 generates an electrical signal sent to the electromechanical component for producing sound vibrations that is part of the sound-producing assembly 16.

The electrical excitation means 40 are arranged between the membrane 38 and the upper face of the control circuit 14 and are connected to the control circuit 14 using surface-mount technology. The external peripheral edge 42 of the membrane 38 is mounted and clamped axially between the secondary wall 28 of the casing 12 and the external peripheral rim 26 of the casing 12. The secondary wall 28 that was substantially axial before assembly has therefore undergone a deformation in order to be able to retain the external peripheral edge 42 of the membrane 38 crushed against the external peripheral rim 26 of the casing 12.

Note that the membrane 38 is made from a plastic material, for example chosen from PEN (polyethylene naphthalate), PET (polyethylene terephthalate) or PP (polypropylene), this plastic material being intended to resist splashing of liquids such as water. This makes it possible to arrange the sound emitter device 10 in the engine compartment of the vehicle where it may be exposed to splashing by various liquids.

The upper opening 24 of the casing 12 is closed by the sound-producing assembly 16.

Alternatively, the acoustic membrane 38 may take the form of a flat flexible disk. The sound emitter device 10 can also include electrical power supply batteries enabling it to operate independently of the battery of the vehicle. The sound emitter device 10 may also comprise an upper cap making it possible to protect the membrane 38 from all exterior aggression.

Figure 3:
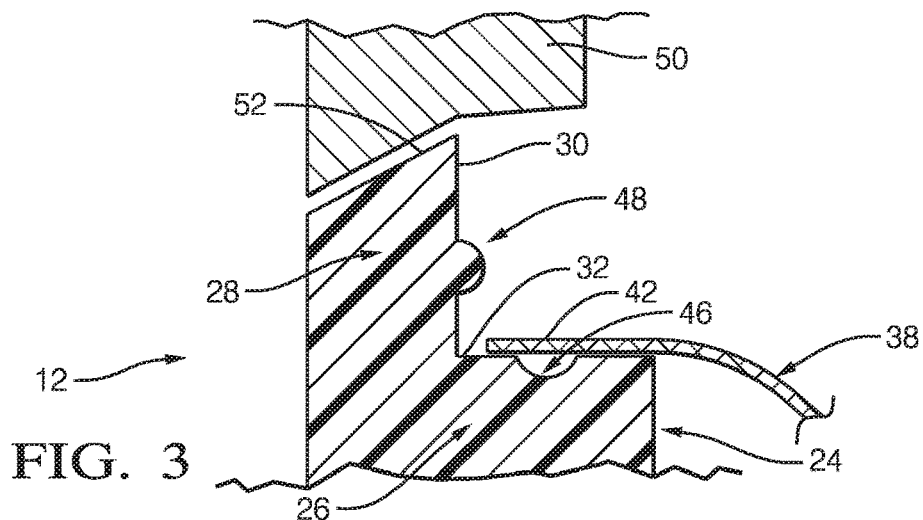
FIG. 3 is a diagrammatic view in axial section of the area retaining the acoustic membrane of the sound emitter device from FIG. 2 during a first step of assembly with the membrane.
Figure 4:
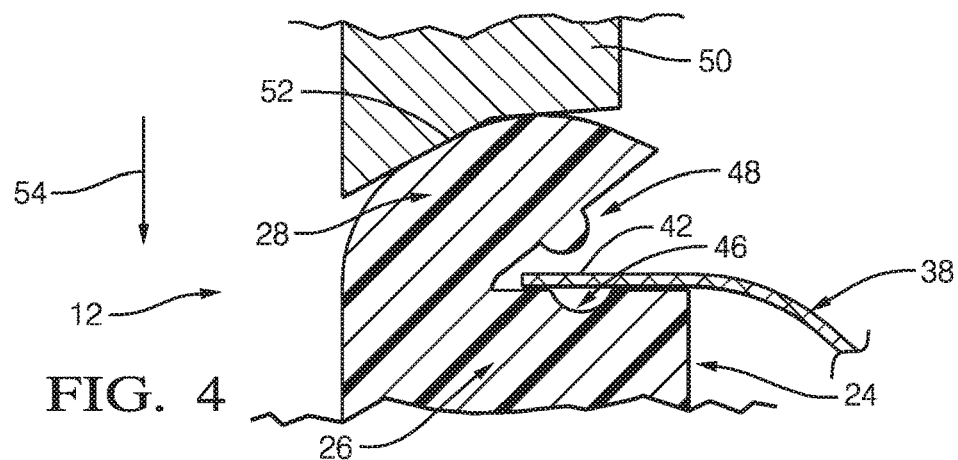
FIG. 4 is a diagrammatic view in axial section of the area retaining the acoustic membrane of the sound emitter device from FIG. 2 during an intermediate step of assembly with the membrane.
Figure 5:
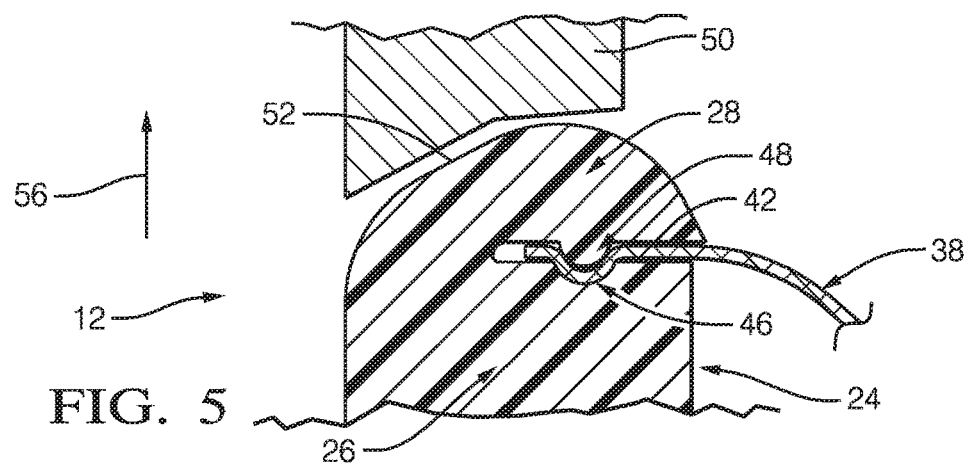
FIG. 5 is a diagrammatic view in axial section of the area retaining the acoustic membrane of the sound emitter device from FIG. 2 during a final step of assembly with the membrane.

In FIGS. 3, 4 and 5 the casing 12 of the sound emitter device 10 described above is represented diagrammatically in axial section. The area retaining the acoustic membrane 38 is more particularly represented according to steps of assembling the membrane. FIGS. 3, 4 and 5 represent the successive steps making it possible to retain the acoustic membrane 38 in the upper opening 24 of the casing.

As shown in FIG. 3 the area for retaining the acoustic membrane 38 is formed in the casing 12 of the sound emitter device 10. The area for retaining the acoustic membrane 38 is formed by the external peripheral rim 26 of the axial wall of the casing and by the substantially cylindrical axial secondary wall 28. The secondary wall 28 is formed around the entire external periphery of the peripheral rim 26. The external peripheral edge 42 of the membrane 38 is disposed so as to bear on the external peripheral rim 26 of the casing. The external peripheral edge 42 of the membrane 38 comes to cover in part the surface of the peripheral rim 32. A part of the external peripheral edge 42 of the membrane 38 preferably comes to cover completely a recess 46 on the surface of the external peripheral rim 32. This recess 46 is an annular groove around the entire perimeter of the peripheral rim 26. The recess 46 has in axial section a profile of semicircular shape. The secondary wall 28 has on its internal face 30 a protuberance 48 of complementary shape to the recess 46 on the surface of the peripheral rim 32.

During assembly of the acoustic membrane 38 to the casing 12, a hot bending tool 50 is disposed axially above and facing the upper face of the secondary wall 52. This hot bending tool 50 preferably makes it possible to bend the secondary wall 28 by vibration. The bending tool 50 is preferably a sonotrode.

As shown in FIG. 4, after it has been disposed against the upper face of the secondary wall 52, the hot bending tool 50 bears downwards in the direction illustrated by the arrow 54. The heat transmitted to the secondary wall 52 and the downward bearing force 54 enable the tool 50 to bend the secondary wall 28 towards the external peripheral rim 26 of the casing 12.

As shown in FIG. 5, the bending of the secondary wall 28 ends when the part of the external peripheral edge 42 of the membrane 38 that previously covered the recess is held and crushed between the recess 46 and the protuberance 48. This means that the arrangement of the recess 46 and the protuberance 48 is such that when the bending step is finished the protuberance 48 is arranged in the recess 46 so as to press a part of the acoustic membrane 38 into the recess 46. The hot bending tool 50 is then moved upwards, in the direction of the arrow 56 shown, so as no longer to be in contact with the secondary wall 28.

Alternatively, the device does not include the recess 46 so that only the protuberance 48 disposed either on the secondary wall 28 or on the external peripheral rim 26 of the casing 12 comes to crush a part of the external peripheral edge 42 of the membrane 38 against the wall that is not equipped with the protuberance or against the external peripheral rim 26 of the casing 12 that is not equipped with the protuberance.

Another alternative is for the secondary wall 28 and the external peripheral rim 26 of the casing 12 to include neither the protuberance 48 nor the recess 46 so that when the secondary wall 28 and the external peripheral rim 26 of the casing 12 are bent towards each other the external peripheral edge 42 of the membrane 38 is retained by virtue of being clamped between them.

This way of retaining the acoustic membrane 38 makes it possible to simplify its assembly, notably with reference to known assembly means such as gluing the membrane or clamping the membrane between the casing and an additional part such as a cover or a ring. This hot bending assembly method makes it possible also to fix the membrane 38 against the axial wall 20 of the casing 12 in a sealed manner.

Alternatively, the recess 46 may be a groove around the entire periphery of the internal face of the secondary wall 30. The protuberance 48 forming the shape complementary to the groove is a rib. The rib is arranged around the entire perimeter of the peripheral rim 26. A plurality of annular grooves 46 and their complementary shape protuberances 48 may be arranged at the periphery of the internal face of the secondary wall 30 and over the entire perimeter of the peripheral rim 26. The recess 46 may equally well be a groove on a part of the perimeter of the peripheral rim 26. The recess 46 may have in axial section a profile of non-semicircular geometrical shape, notably rectangular or forming a V-shaped hollow called a triangular shape. In all geometrical shape situations, the protuberance 48 will have shape characteristics making it possible for it to be arranged in the recess 46 so as to retain the acoustic membrane 38 by pressing on the external peripheral edge 42 of the acoustic membrane 38.

Figure 6:
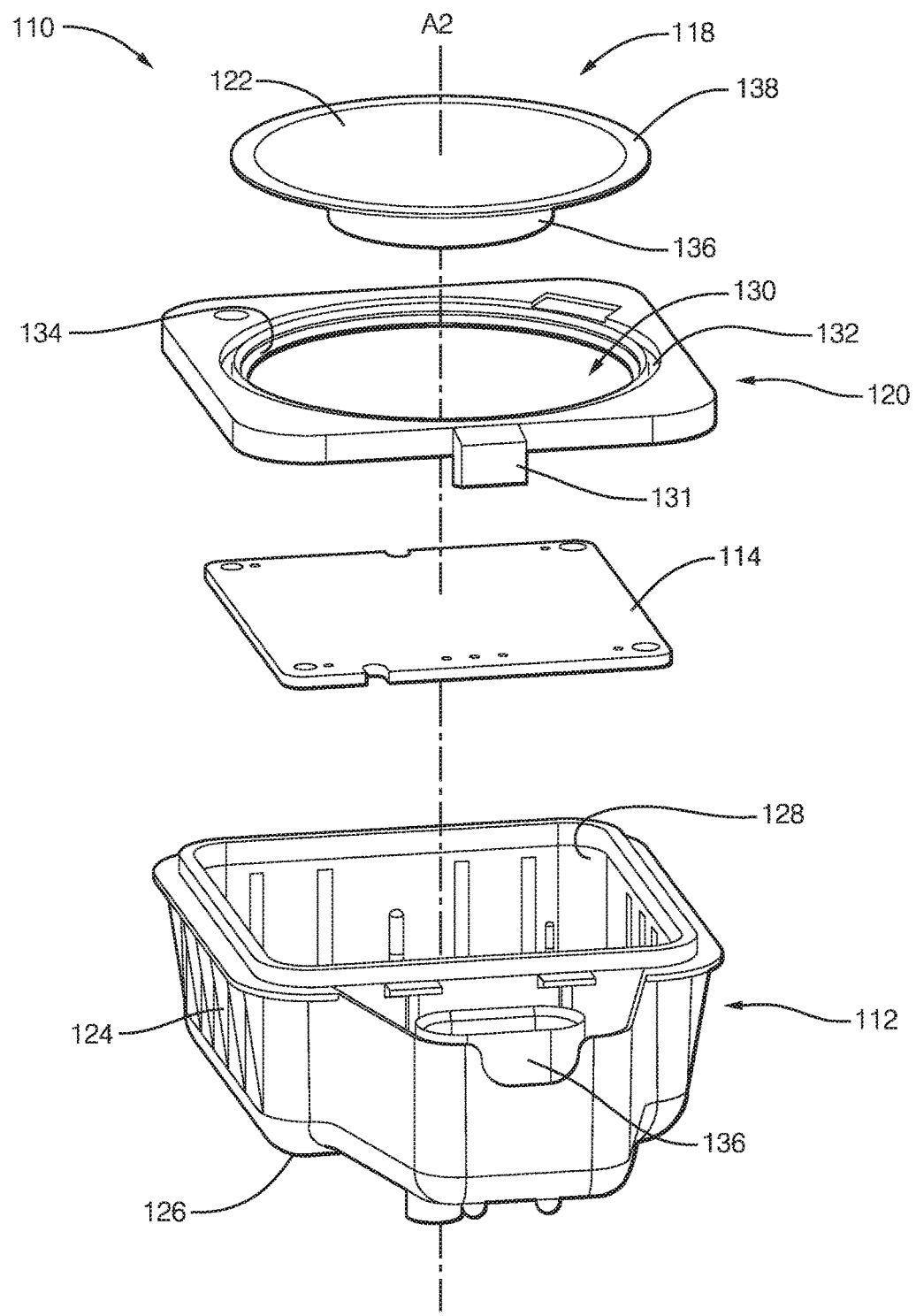
FIG. 6 is an exploded perspective view that represents the sound emitter device according to a second embodiment of the invention.

In FIG. 6 an alternative embodiment of a sound emitter device 110 for use on a motor vehicle is represented before it is assembled. Like the device shown in FIG. 1, the device 110 includes a casing 112 receiving the various components of the device, in particular a control circuit 114, a sound-producing assembly 118 and electrical connecting means (not represented). Moreover, the casing 112 includes an attached cover 120 making it possible to retain the acoustic membrane 122 of the sound-producing assembly 118. The principles of operation and of electrical connection between the various electronic components of this embodiment remain similar to those described above.

The casing 112 is formed of a substantially cylindrical axial wall 124 that here extends along the vertical axis A2 from a transverse bottom wall 126 towards an upper opening 128. The upper opening 128 is substantially rectangular.

The cover 120 includes a plane surface of substantially rectangular shape designed to close the upper opening 128 of the casing 112. A clip 131 for retaining the cover 120 on the axial wall 124 of the casing 112 is preferably arranged on the exterior periphery of the cover 120.

Alternatively, the upper opening 128 of the casing and the cover 120 may have a non-rectangular geometrical shape; for example circular shapes or polygonal shapes may be envisaged.

The cover 120 has a hole 130 passing through it that is of substantially circular shape. The through-hole 130 includes an internal peripheral rim 132. As shown, the internal peripheral rim 132 occupies the entire periphery of the through-hole 130. There is a substantially cylindrical axial secondary wall 134 around the entire external periphery of the peripheral rim 132. The substantially cylindrical axial secondary wall 134 is made in one piece with the internal peripheral rim 132 of the through-hole 130. There is an electrical connector 136 on the exterior of the casing 112 in order to connect the sound emitter device 110 to the electrical power supply network of the vehicle.

Here the sound-producing assembly 118 includes a membrane 122, or diaphragm, associated with electrical excitation means 136 such as piezoelectric, electromagnetic, electromechanical or like components. The general shape of the membrane 122 is that of a flexible disk curved downwards and towards its centre. The membrane 122 may equally well have the general shape of a flat disk. The membrane 122 includes an external peripheral edge 138 making it possible to dispose it so as to bear on the internal peripheral rim 132 of the through-hole 130 in the cover 120.

The cover 120 may have various geometrical shapes, so as to make it possible to assemble it with the casing whatever the shape of the opening in the casing, the acoustic membrane 122 being disposed so as to bear on the internal peripheral rim 132 of the through-hole 130 in the cover 120.

Figure 7:
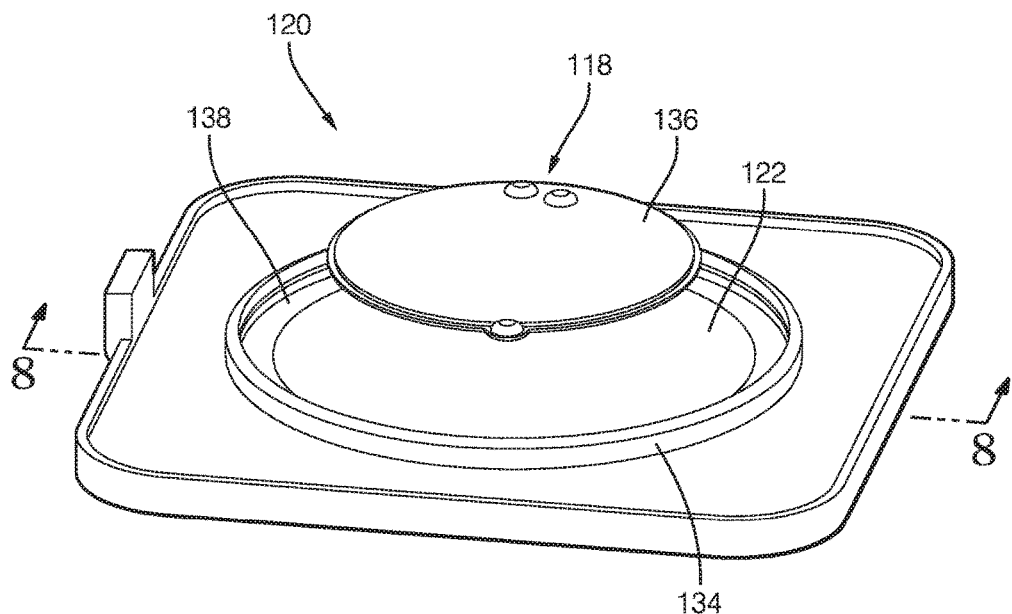
FIG. 7 is a perspective view of the assembly of the acoustic membrane with the cover of the sound emitter device from FIG. 6.
Figure 8:
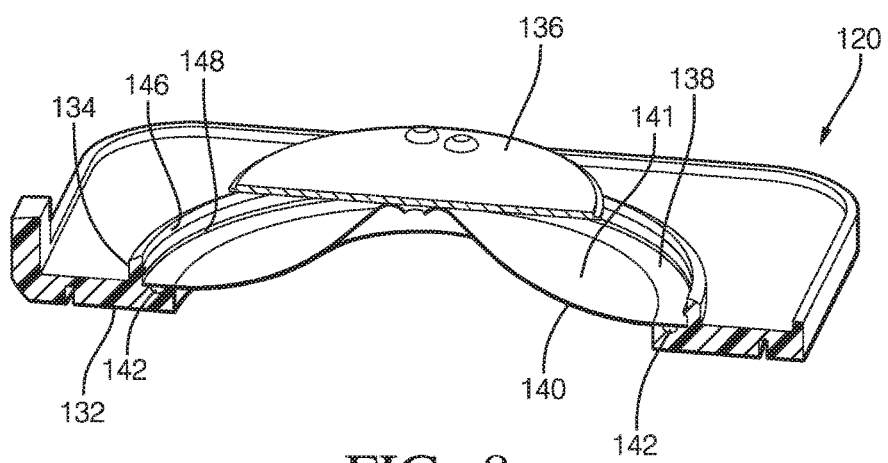
FIG. 8 is a perspective view in axial section on the plane 8-8 that represents the cover from FIG. 7.

According to FIGS. 7 and 8, the sound-producing assembly 118 is disposed so as to bear on the internal peripheral rim 132 of the through-hole 130 in the cover 120. There has been shown a non-limiting embodiment in which the upper face of the membrane 140, that is to say the face that is disposed towards the air outside the sound-producing assembly 118 when the latter is assembled, bears on the internal peripheral rim 132 of the through-hole 130 in the cover 120. This makes it possible to improve the sealing of the device 110 when the membrane 122 is retained and crushed between the internal peripheral rim 132 of the through-hole 130 in the cover 120 and the secondary wall 134 when the latter is bent according to the process shown in FIGS. 3, 4 and 5. Note that in this embodiment the electrical excitation means 136 are preferably fixed to the lower face 141 of the membrane 122, that is to say to the face of the membrane 122 that faces the control circuit 114.

In FIG. 8 the external peripheral edge 138 of the upper face of the membrane 140 covers an annular groove 142 around the entire perimeter of the internal peripheral rim 132 of the through-hole 130 in the cover 120. The internal face 146 of the secondary wall 134 includes a rib 148 of complementary shape to the groove 142 in the surface of the internal peripheral rim 150. When the sound-producing assembly 118 is assembled with the cover 120 of the casing 112, the membrane 122 is retained and crushed by the rib 148 in the groove 142 when the secondary wall 134 of the through-hole 130 in the cover 120 is bent according to the method shown in FIGS. 3, 4 and 5.

Alternatively, the acoustic membrane 122 may be assembled in the cover 120 without being fixed to the electrical excitation means 136.

The groove 142 and the rib 148 may have geometrical shapes identical to the shapes described in the embodiment illustrated by FIGS. 1, 2, 3.

Figure 9:
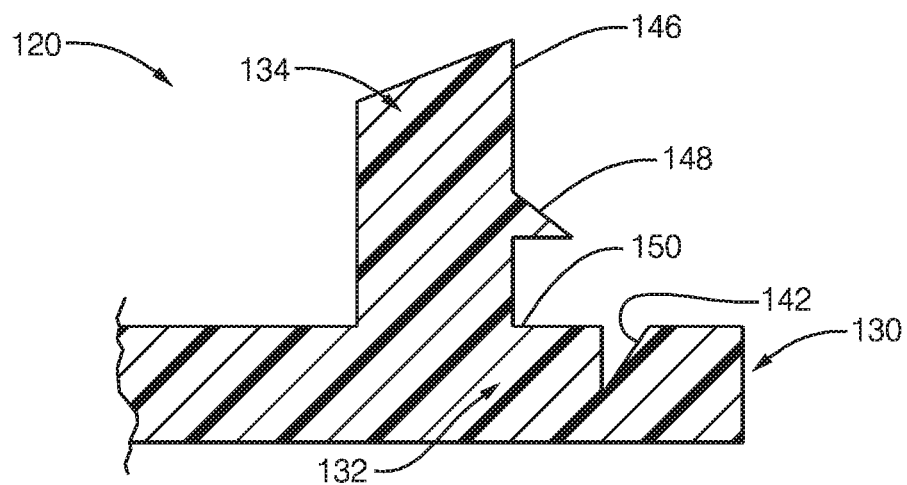
FIG. 9 is a diagrammatic view in cross section of the area retaining the acoustic membrane of the cover from FIG. 7 according to a first variant.
Figure 10:
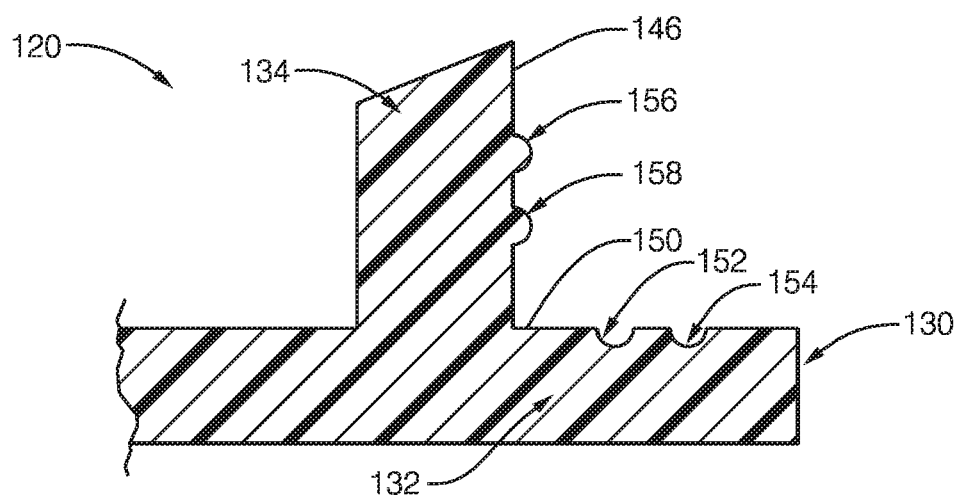
FIG. 10 is a diagrammatic view in cross section of the area retaining the acoustic membrane of the cover from FIG. 7 according to a second variant.

In FIG. 9 and FIG. 10 an axial section of the cover 120 described with reference to FIGS. 6, 7 and 8 is represented diagrammatically and the area for retaining the acoustic membrane 122 is more particularly represented before the step of assembly with the membrane 122.

In FIG. 9 the annular groove 142 on the internal peripheral rim 132 of the through-hole 130 in the cover 120 may have in axial section a V-shaped profile. The rib 148 is therefore on the internal face 146 of the secondary wall 134 of the through-hole 130 in the cover 120.

In FIG. 10 there are two grooves 152, 154 with a profile in axial section of semicircular shape on the internal peripheral rim 132 of the through-hole 130 in the cover 120. The ribs 156, 158 having a profile in axial section of semicircular shape are therefore on the secondary wall 134 of the through-hole 130 in the cover 120. This makes it possible to strengthen the retention of the acoustic membrane 122 when the latter is retained and pressed into the two grooves 152, 154 by the two ribs 156, 158 of the secondary wall 134 bent by the method described with reference to FIGS. 3, 4 and 5. Alternatively, there may be a plurality of grooves with a profile in axial section of different shape on the internal peripheral rim 132 of the through-hole 130 in the cover 120.

Figure 11:
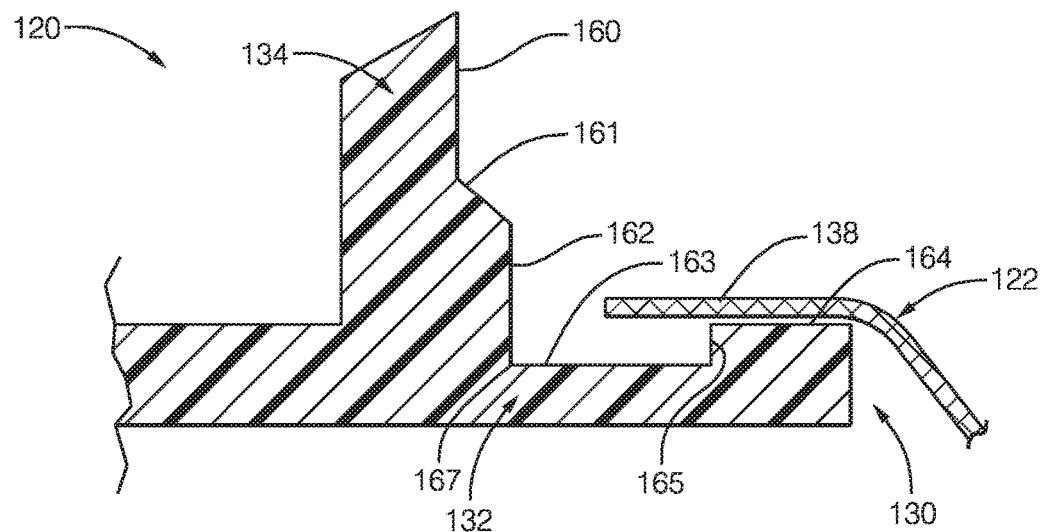
FIG. 11 is a diagrammatic view in cross section of the retaining area of the acoustic membrane of the cover from FIG. 7 according to a third variant during a first step of assembly with the membrane.
Figure 12:
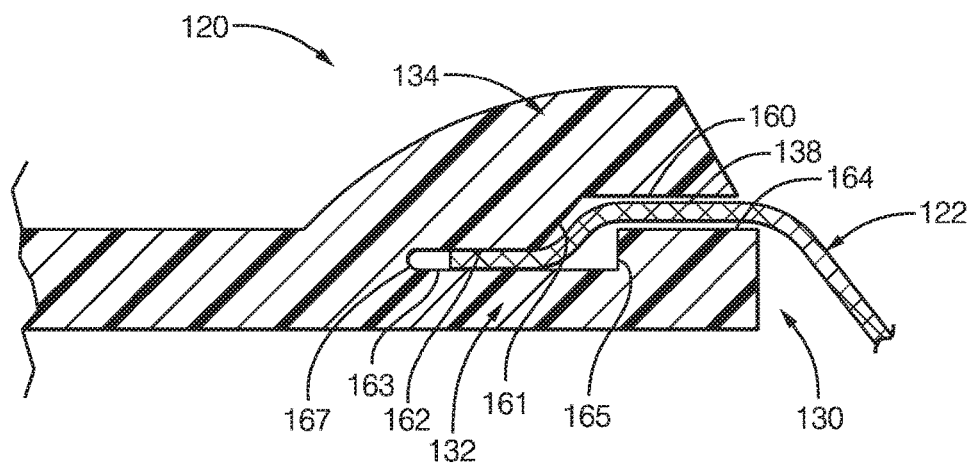
FIG. 12 is a diagrammatic view in cross section of the area retaining the acoustic membrane of the cover from FIG. 7 according to the third variant when the assembly of the membrane is finished.

In FIGS. 11 and 12 the cover 120 of the sound device 110 described with reference to FIG. 7 is represented diagrammatically in axial section. The area for retaining the acoustic membrane 122 is more particularly represented according to steps of assembly of the membrane. FIGS. 11 and 12 respectively represent a step of arranging the membrane 122 before its final assembly and a step in which the membrane 122 is definitively retained by the cover 120 according to a third assembly variant.

According to FIG. 11, the area for retaining the membrane is represented before bending the secondary wall 134. The secondary wall 134 has on its internal face three sections, a first section 162 extending axially from the peripheral rim 132 as far as a second section 161 forming an oblique step oriented towards the exterior of the cover 120 and connecting the first section 162 to a third section 160 oriented axially with respect to the transverse axis A2. The surface 150 of the internal peripheral rim 132 of the through-hole 130 has a profile in axial section forming a single right-angled step like a staircase. The right-angled step includes a surface of the lower element 163 of the step, a surface of the higher element 164 of the step and a surface of the right-angle element 165 forming the junction between the lower element and the higher element of the step. The surface of the lower element 163 is connected to the first section 162 of the secondary wall 134 by a hinge area 167 so as to be adjacent the first section 162. The lower element of the step and the first section 162 of the secondary wall respectively form a recess in the peripheral rim 132 and a protuberance on the secondary wall 162. The geometrical shape of the surface of the internal peripheral rim 132 and the geometrical shape of the secondary wall 134 are substantially complementary so that when the secondary wall 134 is bent over the peripheral rim 132 the first section 162 of the secondary wall is arranged in a quasi-complementary manner towards the lower element of the step.

The external peripheral edge 138 of the membrane 122 is on the surface of the higher element 164 of the step and partly covers the surface of the lower element 163 of the step so that it can be pressed both onto the surface of the lower element 163 of the step and onto the surface of the higher element 164 of the step by the first section 162 and by the third section 160 of the secondary wall 134, respectively.

Alternatively, the second section 161 of the internal face may form a substantially perpendicular step oriented towards the exterior of the cover 120. The surface of the junction element 165 of the step may equally well be oblique. An alternative is for the higher element of the step and the lower element of the step to be arranged in the converse way, so that the complementary shape formed by the secondary wall 134 is such that the first section 162 extends axially from the peripheral rim 132 as far as the second section 161 forming an oblique step oriented towards the interior of the cover 120 and connecting the first section 162 to the third section 160.

In FIG. 12 the area for retaining the membrane is represented after bending the secondary wall 134. The surface 150 of the internal peripheral rim 132 and the internal face 146 of the secondary wall 134 are connected by a hinge area 167 so as to form a jaw on the acoustic membrane 38, 122. The internal face 146 of the secondary wall 134 presses the external peripheral edge 42, 138 of the acoustic membrane 38, 122 onto the surface 150 of the internal peripheral rim 132. The lower element 163 of the step is connected to the secondary wall 134 by the hinge area 167. A part of the external peripheral edge 42, 138 of the acoustic membrane 38, 122 is pressed onto the surface of the lower element 163 of the step by the secondary wall 134 and the other part of the external peripheral edge 42, 138 of the acoustic membrane 38, 122 is pressed onto the surface of the higher element 163 of the step by the secondary wall 134.

The set of embodiments described above is not limited to retaining the acoustic membrane in some cases in the opening of the casing of the first embodiment of the sound emitter device and in other cases in the through-hole of the cover described in the second embodiment of the sound emitter device. The devices for retaining the acoustic membrane described above make it possible to retain the membrane in the first and second embodiments of the sound emitter device.

While this invention has been described in terms of the preferred embodiments thereof, it is not intended to be so limited, but rather only to the extent set forth in the claims that follow.

We claim:

1. A sound emitter device for use on a motor vehicle, said sound emitter device comprising:
   a casing that defines an axial wall and a bottom wall, the axial wall extending along a vertical axis from the bottom wall toward an opening opposite the bottom wall;
   a control circuit;
   an acoustic membrane arranged in the opening of the casing, a lower face of the acoustic membrane coupled to an excitation means controlled by the control circuit;
   wherein the casing further defines
   a peripheral rim arranged in the opening, an external peripheral edge of the acoustic membrane being mounted to bear on the peripheral rim;
   a secondary wall made in one piece with the peripheral rim, said secondary wall is bent toward the peripheral rim so as to retain the acoustic membrane by clamping the external peripheral edge between the peripheral rim and the secondary wall wherein one of the peripheral rim and the secondary wall include at least one protuberance bearing against the external peripheral edge of the acoustic membrane, wherein one of the peripheral rim and the secondary wall include at least one recess of complementary shape to the protuberance so that a part of the external peripheral edge of the acoustic membrane is pressed into the recess by the protuberance, wherein the external peripheral edge of the acoustic membrane deformed by the clamping of the external peripheral edge between the peripheral rim and the secondary wall to conform with the protuberance and complementary shape.

2. The sound emitter device according to claim 1, wherein the recess and the protuberance are of annular shape and extend entirely around a perimeter of the secondary wall and the peripheral rim.

3. The sound emitter device according to claim 2, wherein the secondary wall and the peripheral rim include a plurality of recesses and a plurality of protuberances having concentric annular shapes.

4. The sound emitter device according to of claim 1, wherein the protuberance has in axial section a profile of one of a semicircular shape, a triangular shape, and a rectangular shape.

5. The sound emitter device according to of claim 1, wherein
   a surface of the peripheral rim has in axial section a profile forming a step;
   a part of the external peripheral edge of the acoustic membrane is pressed onto the step by the secondary wall.

6. The sound emitter device according to of claim 1, wherein the secondary wall and the peripheral rim are part of a cover that is mounted on the casing to close the opening therein.

7. The sound emitter device according to of claim 6, wherein the secondary wall and the peripheral rim are arranged on a lower face of the cover.

* * * * *